Aug. 7, 1951 R. S. PYLE 2,563,067
MULTIPLE UNIT BAKING PAN
Filed March 20, 1948

INVENTOR.
Ray S. Pyle

Patented Aug. 7, 1951

2,563,067

UNITED STATES PATENT OFFICE 2,563,067

MULTIPLE UNIT BAKING PAN

Ray S. Pyle, Lakewood, Ohio

Application March 20, 1948, Serial No. 16,000

4 Claims. (Cl. 220—23.4)

My invention relates to cooking and baking utensils in general, but relates particularly to sectional pan structure.

The size of families vary of course, from one in a bachelor apartment, to many in a large family. These families often bake small loaves of pastry called muffins. However, regardless of the number of persons to bake for, the homekeeper has only two choices of pans provided by the pan industry today. For example, a newly married couple, or an older couple whose children have all left home, will make from two to four muffins for one meal. Today especially, with the new packaged ready-mixed flour, the homekeeper can prepare exactly the amount of dough desired. The conventional pan available to bake the dough has either six or twelve cups. Therefore, several cups are left vacant to burn and discolor, or more muffins are made than are actually desired. Further, the large area consumed by a conventional pan having six or more cups occupies one whole oven shelf, and often the muffins will not be made, because other things occupy the available space.

Therefore, an object of this invention is to provide a pan section which may be coupled to other such pan sections to assemble a pan having exactly the desired baking capacity.

Another object of this invention is to provide a sectional pan structure which may be removably clipped together.

A further object of this invention is to provide fool-proof means to clip pan sections together, whereby no mechanical knowledge or aptitude is required to assemble two or more pan sections into a pan unit.

Figure 1:
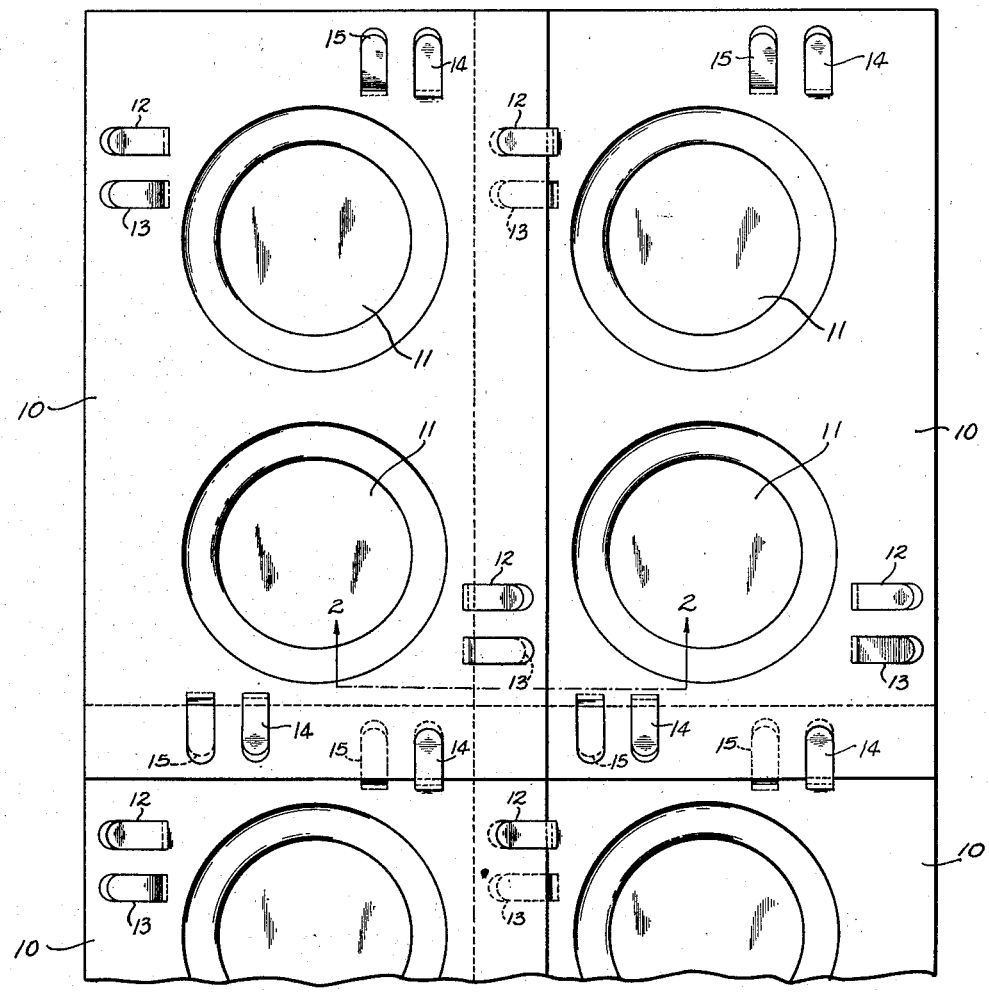
Figure 2:
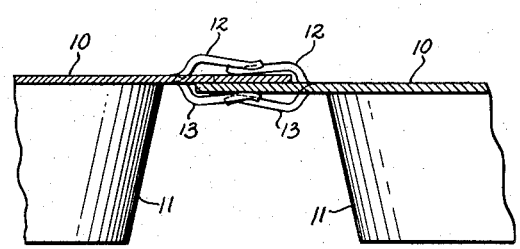
Figure 3:
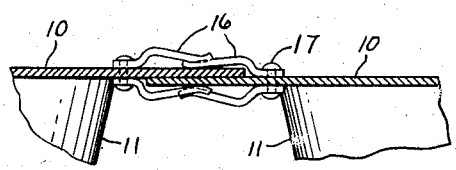

Other objects and a fuller understanding of this invention may be had by referring to the accompanying drawing, taken in conjunction with the following description and claims, in which:

Figure 1 of the drawing is a top view of one pan section made in accordance with this invention, with portions of similar pan sections removably attached thereto by clip means as provided by this invention;

Figure 2 is a sectional edge view of joining portions of two pan sections taken along line 2—2 of Figure 1; and Figure 3 is a view similar to Figure 2 of an alternate clip structure.

The preferred embodiment is illustrated in order to set forth the principles of the invention, but it is to be understood that other embodiments may be provided which will carry out the objects of the invention, and will therefore be within the scope of this invention.

In the Figure 1, the pan plate is indicated by reference character 10. The pan plate 10 may be made of light weight sheet metal or aluminum as commonly used for large size conventional muffin pans.

Two cup portions 11 for each pan section has been found to be preferable, although one or three may be used in some instances to good advantage. The cup portions are provided by extruding or by attaching separately formed cups, as desired.

The cup portions 11 are centrally positioned internally of the pan plate 10, and thereby allow a marginal edge portion around the cup sections. As a specific example, in a pan section having cup portions 2⅝ inches in diameter at the top, a marginal edge from ¾ to one inch wide is preferable.

The pan section may be provided with integral side clips 12 and 13, and end clips 14 and 15, as illustrated best in Figure 2, or it may be provided with separately fabricated clips 16 attached by suitable means such as spot welding or rivets 17. Regardless of the type selected, the operation of the clips is the same.

The integral type clips are preferable provided in pairs, with clip 12 of the pair extending upwardly from the pan plate 10, and the clip 13 of the pair extending downwardly from the pan plate 10. Although not essential, the clips should preferably be off center relative to the edge of the pan in order that the clips will be staggered and not meet when two pan sections are joined. That is, side clips 12 and 13 are preferably positioned closer to one end than another. They may be staggered in pairs as indicated in the drawing, or they may be individually staggered. That is, clip 12 may be set near one end and clip 13 near the opposite end. Of course, the same reasoning will apply to end clips 14 and 15, which are illustrated as being staggered off center in pairs, the clip 14 being the up-clip, and 15 the down-clip.

By staggering the side and end clips as illustrated and discussed, the pan sections may be joined by overlapping their marginal edge portion as illustrated in the drawing. It will make no difference whether the marginal portion of a first pan section is on top or below the marginal portion of a joining pan section, because if on top, the edge thereof will be engaged by clip 12 extending above the surface of the joining pan section, and the edge of the joining pan section will extend below the marginal edge of the first pan section and will be engaged by the clip 13 extending below the surface of the first pan section.

On the other hand, if the marginal portion of the first pan section is below the marginal portion of the joining pan section, the edge thereof will be engaged by clip 13 extending below the surface of the joining pan section, and the edge of the joining pan section will be above the marginal edge of the first pan section and will be engaged by clip 12 of the first pan section.

Because the clips are staggered by being offset, the up-clips, or the down-clips of two pan sections will never meet, and further, there will always be two separated points of joinder between joining pan sections.

Any number of pan sections may be joined in side to side relationship, but the practical number will be limited by the strength of the material from which the pan plate 10 and the clips are made.

The clips 14 and 15 are provided in the same manner and under the same conditions as explained in conjunction with clips 12 and 13. These clips 14 and 15 are used to join pan sections in end to end relationship, and to thereby join two series of pan sections together. For example, two or three pan sections may be joined in side to side relationship to form a pan series. Thereafter, that series may be joined to another series by means of the end clips 14 and 15.

In another case, the available space for the pan sections may be long and narrow, such as the space left beside a large roast pan. In that event two or three pan sections may be joined in tandem fashion by joining them in end to end relationship.

Even though a large number of muffins may be desired, for example say twelve, it is often desirable to have them come from the oven hot as they are desired rather than attempting to store the baked muffin to keep it warm. Therefore the pan sections may be used individually and put into the oven in succession, to thereby provide a steady production of finished product.

The alternate clip structure illustrated in Figure 3 may be provided by separate clip members 16 attached by any suitable means. Rivets 17 are illustrated, but spot welding, if practical, is entirely satisfactory. The clip members 16 may be of any width, even to extend the entire length of the side edge of the pan section, and they may be provided of heat treated spring steel to assure good strong joinder between pan sections.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as the invention:

1. A pan, comprising a plate having a top surface, and having a bottom surface and at least an edge, at least a cup depression portion located internally of the plate, the said plate having a margin portion surrounding the said cup depression portion, at least a first clip member extending from said top surface and joining said top surface a distance inwardly from said edge, at least a second clip member extending from said bottom surface and joining said bottom surface a distance inwardly from said edge, said clip members each being adapted to engage the marginal portion of another baking pan which is placed in surface contact with the surface from which the clip extends, whereby a plurality of such baking pans may be detachably coupled together by overlapping their margin portions with the top surface clip of one pan engaging the marginal portion of another pan, and the bottom surface clip of that other pan engaging the marginal edge of said one pan.

2. A pan for use as a detachable section of a sectional pan unit comprising, a substantially flat marginal portion having a top surface and a bottom surface, a pan portion surrounded by said marginal portion, said flat marginal portion having at least a first clip portion adapted to press the marginal portion of another pan into tight surface contact with said top surface, and having at least a second clip portion adapted to press the marginal portion of another pan into tight surface contact with said bottom surface.

3. A pan for use as a detachable section of a sectional pan unit comprising, a substantially flat marginal portion having a top surface and a bottom surface and a substantially rectangular outline, a pan portion located internally of said marginal portion, said marginal portion having a first outer edge, a second outer edge, a third outer edge, and a fourth outer edge, first, second, third, and fourth top yieldable grip securing means adapted to hold a flat member in tight surface contact with said top surface, said first top securing means being positioned inwardly of the first outer edge, said second top securing means being positioned inwardly of the second outer edge, said third top securing means being positioned inwardly of the third outer edge, said fourth top securing means being positioned inwardly of the fourth outer edge, first, second, third, and fourth bottom yieldable grip securing means adapted to hold a flat member in tight surface contact with said bottom surface, said first bottom securing means being positioned inwardly of the first outer edge, said second bottom securing means being positioned inwardly of the second outer edge, said third bottom securing means being positioned inwardly of the third outer edge, and said fourth bottom securing means being positioned inwardly of the fourth outer edge.

4. A pan for use as a detachable section of a sectional pan unit comprising, a substantially flat marginal portion having a top surface and a bottom surface, a pan portion joined to said marginal portion, said flat marginal portion having at least a first clip portion adapted to press the marginal portion of another pan into tight surface contact with said top surface, and having at least a second clip portion adapted to press the marginal portion of another pan into tight surface contact with said bottom surface.

RAY S. PYLE.

REFERENCES CITED

The following references are of record in the file of this patent:

UNITED STATES PATENTS

| Number | Name | Date |
|---|---|---|
| 96,605 | Milligan | Nov. 9, 1869 |
| 271,891 | McDermott | Feb. 6, 1883 |
| 812,800 | McLean | Feb. 13, 1906 |
| 2,141,861 | Hahn et al. | Dec. 27, 1938 |
| 2,265,618 | Adams | Dec. 9, 1941 |
| 2,495,132 | Remco | Jan. 17, 1950 |